United States Patent
Morrison et al.

(10) Patent No.: US 8,120,904 B2
(45) Date of Patent: Feb. 21, 2012

(54) CHASSIS MOUNTING SYSTEM

(75) Inventors: John Trevor Morrison, Round Rock, TX (US); Bradley Jackson, Pflugerville, TX (US); Danielle Paige Smith, Cedar Park, TX (US); Rajib Adhikary, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 515 days.

(21) Appl. No.: 12/361,946

(22) Filed: Jan. 29, 2009

(65) Prior Publication Data
US 2010/0188812 A1    Jul. 29, 2010

(51) Int. Cl.
*H05K 5/00* (2006.01)
*H05K 7/00* (2006.01)
(52) U.S. Cl. .............. 361/679.58; 248/286.1; 248/285.1
(58) Field of Classification Search ............. 361/679.58; 248/286.1, 285.1
See application file for complete search history.

(56) References Cited

U.S. PATENT DOCUMENTS

| 5,074,512 | A | 12/1991 | Gianforcaro, II et al. |
| 6,029,580 | A | 2/2000 | Alfonso |
| 6,208,505 | B1 | 3/2001 | Kuchta et al. |
| 6,560,094 | B2 | 5/2003 | Schmidt |
| 7,317,613 | B2 * | 1/2008 | Quijano et al. .......... 361/679.41 |
| 7,471,511 | B2 * | 12/2008 | Montag et al. ........... 361/679.41 |
| 2008/0284676 | A1 * | 11/2008 | Moscovitch .................. 345/1.3 |

* cited by examiner

*Primary Examiner* — Anthony Haughton
(74) *Attorney, Agent, or Firm* — Haynes and Boone, LLP

(57) ABSTRACT

A chassis mounting system includes a support section that is operable to be coupled to a structure. The support section includes a first arm extending from the support section. A second arm extends from the support section and is moveable relative to the first arm such that the distance between the first arm and the second arm may be varied in order to apply a gripping force on the structure when the structure is located between the first arm and the second arm. A locking device is operable to restrict the movement of the second arm relative to the first arm in order to secure the support section to the structure when the gripping force has been applied. A coupling section support member is located on the support section. A coupling section is operable to be mounted to a chassis. The coupling section includes a coupling member that is operable to engage the coupling section support member in order to couple the coupling section to the support section such that the support section supports the coupling section.

18 Claims, 19 Drawing Sheets

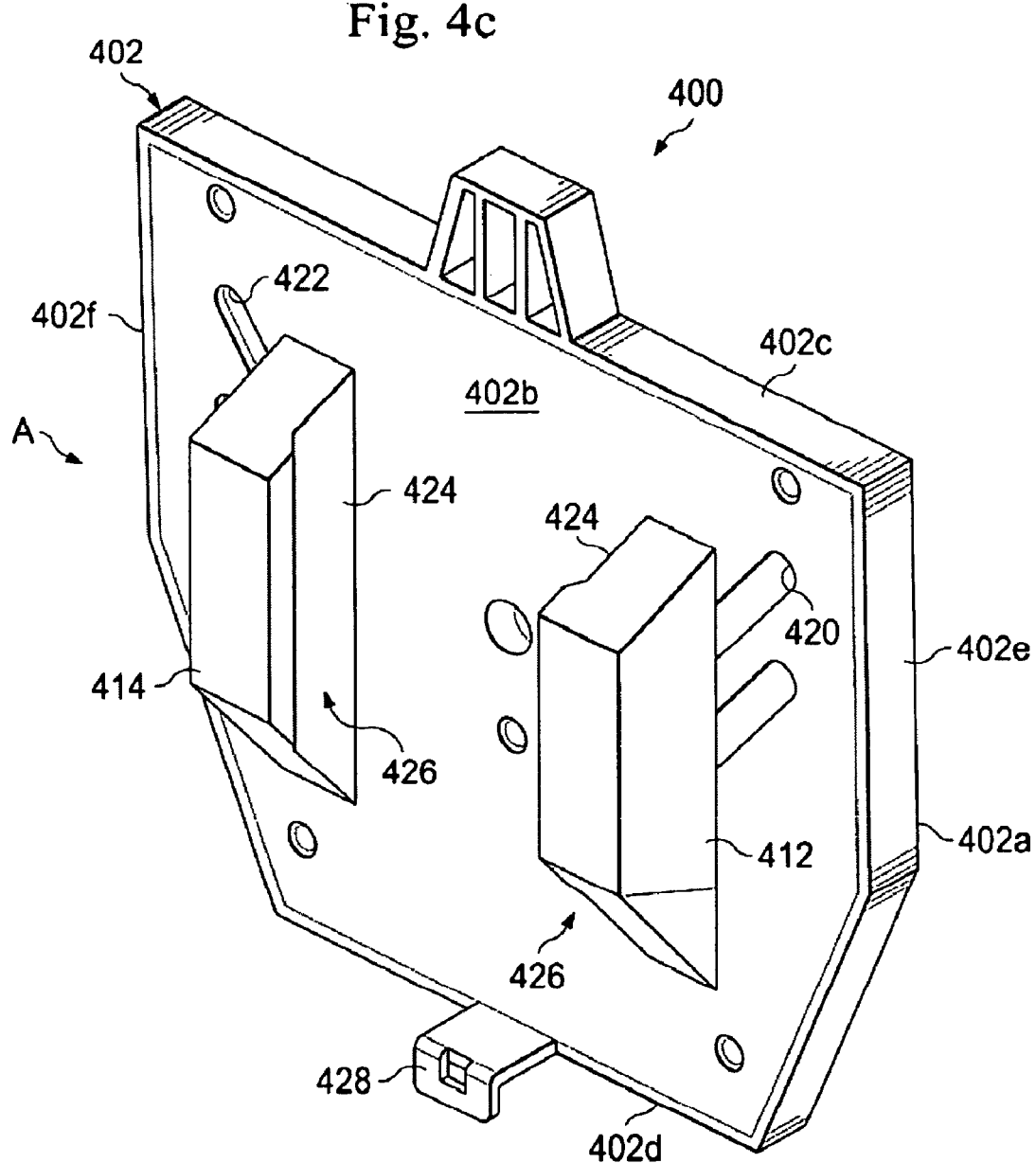

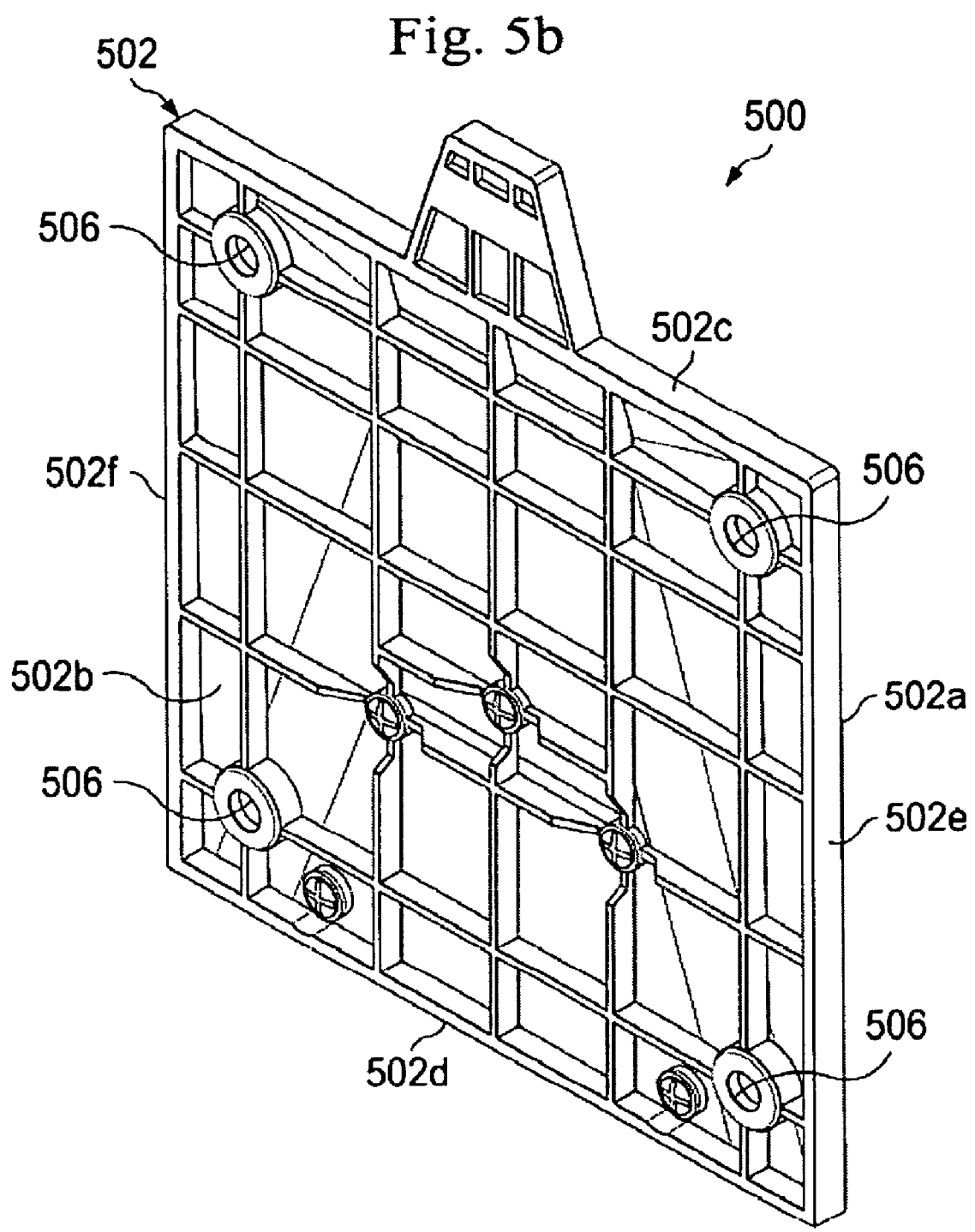

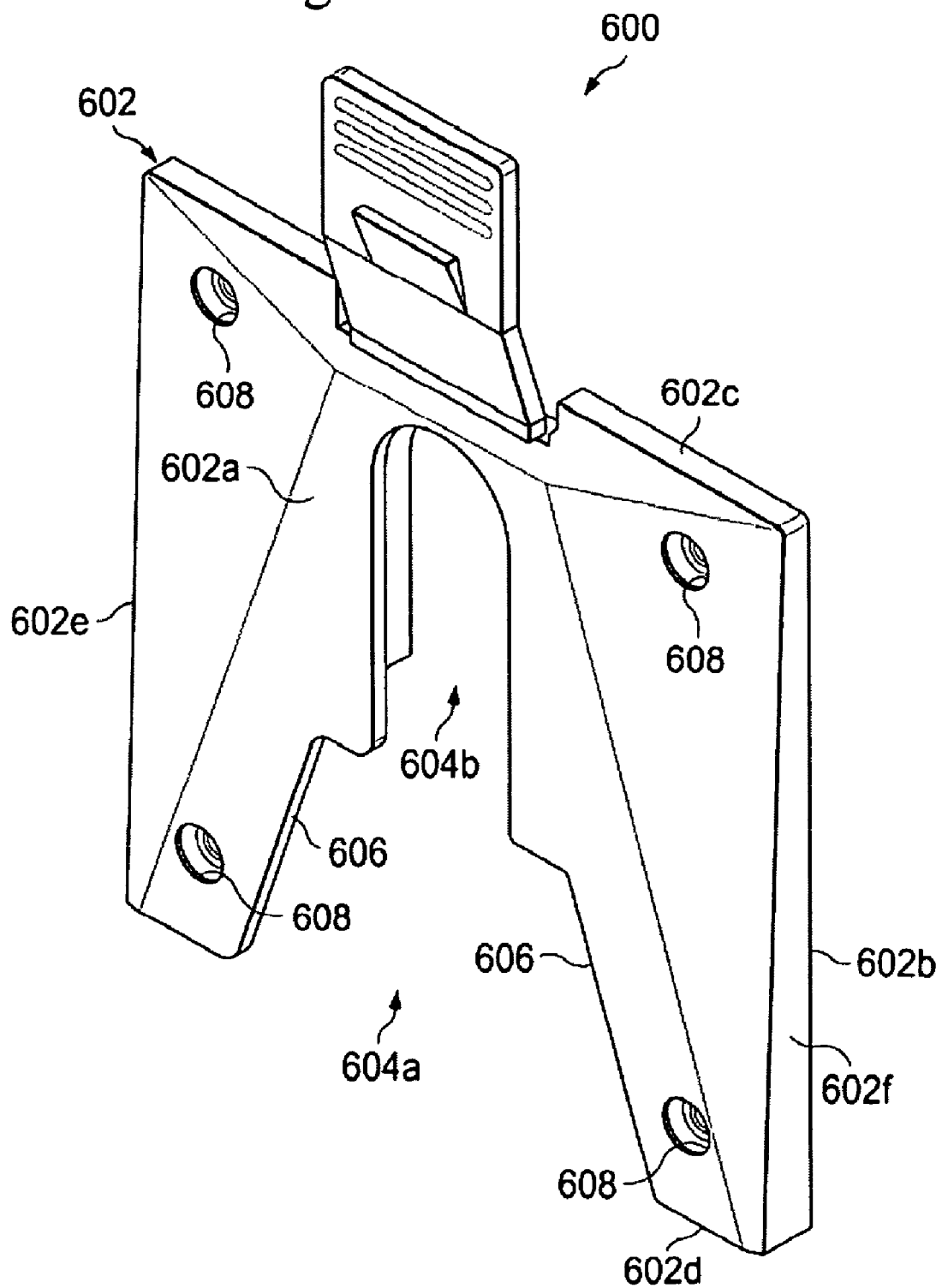

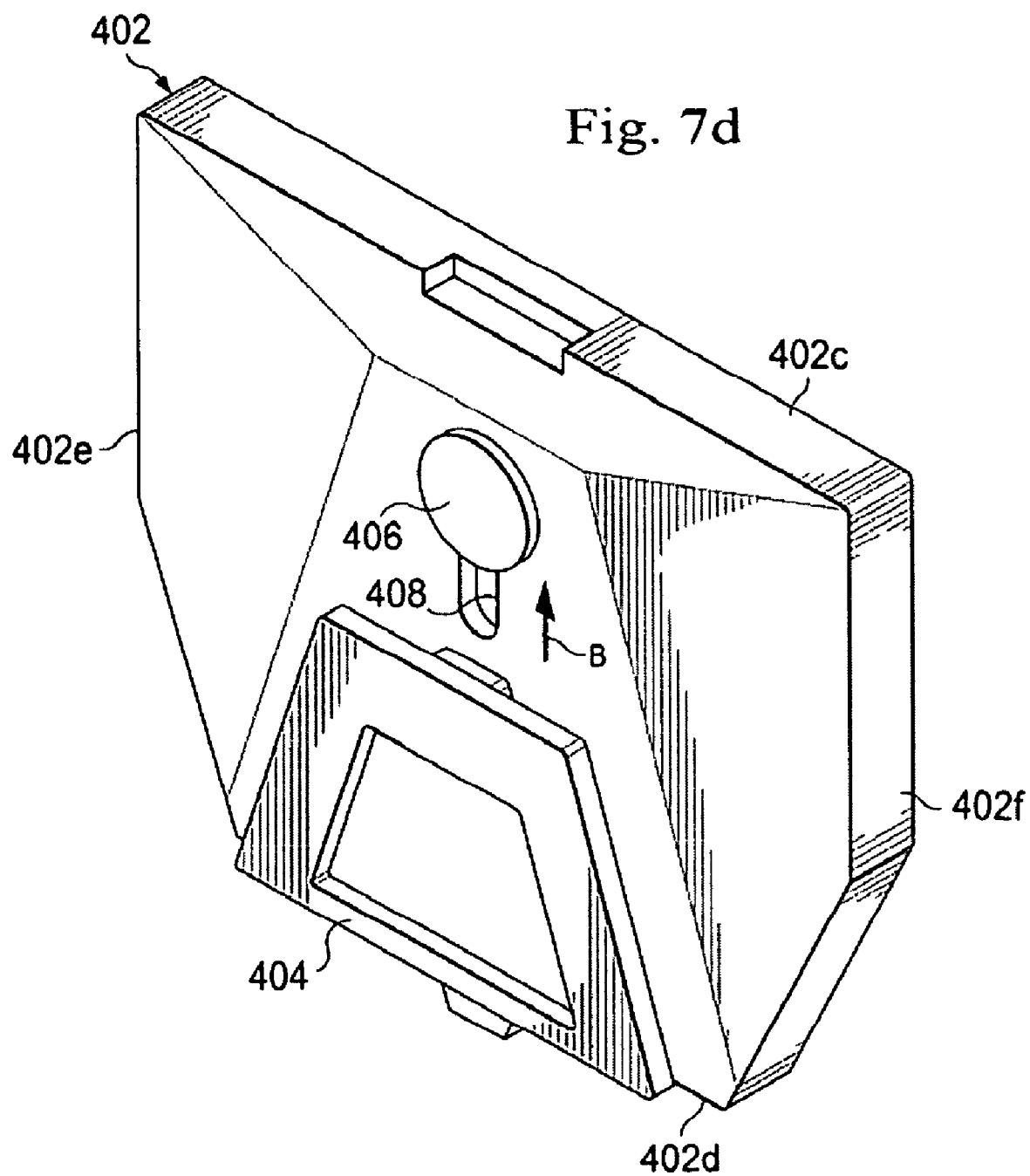

CHASSIS MOUNTING SYSTEM

BACKGROUND

The present disclosure relates generally to information handling systems, and more particularly to a chassis mounting system for an information handling system chassis.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In some IHSs such as, for example, desktop IHSs, the components of the IHS are housed in an IHS chassis that is coupled to peripheral devices that allow the IHS to be operated by a user. As the IHS components have become smaller, the IHS chassis has reduced in size as well. With this reduction in size, the locating and mounting of the IHS chassis can be used as a selling point for the IHS.

Accordingly, it would be desirable to provide a chassis mounting system for an IHS.

SUMMARY

According to one embodiment, a chassis mounting system includes a support section that is operable to be coupled to a structure, wherein the support section includes a first arm extending from the support section, a second arm extending from the support section, wherein the second arm is moveable relative to the first arm such that the distance between the first arm and the second arm may be varied in order to apply a gripping force on the structure when the structure is located between the first arm and the second arm, a locking device that is operable to restrict the movement of the second arm relative to the first arm in order to secure the support section to the structure when the gripping force has been applied, and a coupling section support member. In addition, a coupling section is operable to be mounted to a chassis, wherein the coupling section comprises a coupling member that is operable to engage the coupling section support member in order to couple the coupling section to the support section such that the support section supports the coupling section.

BRIEF DESCRIPTION OF THE DRAWINGS

FIG. 4b is an internal perspective view illustrating an embodiment of the display stand support section of FIG. 4a.

FIG. 4c is an rear perspective view illustrating an embodiment of the display stand support section of FIG. 4a.

FIG. 5b is a rear perspective view illustrating an embodiment of the wall support section of FIG. 5a.

FIG. 6a is a front perspective view illustrating an embodiment of a coupling section used with the display stand support section of FIGS. 4a, 4b and 4c or the wall support section of FIGS. 5a and 5b.

FIG. 6b is a rear perspective view illustrating an embodiment of the coupling section of FIG. 6a.

FIG. 7d is a front view illustrating an embodiment of the display stand support section of FIGS. 4a, 4b and 4c during coupling.

FIG. 8b is a perspective view illustrating an embodiment of the IHS chassis and coupling member of FIG. 7c being coupled to the display stand support section and wall structure of FIG. 8a.

FIG. 8c is a perspective view illustrating an embodiment of the IHS chassis and coupling member of FIG. 7c coupled to the display stand support section and wall structure of FIG. 8a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
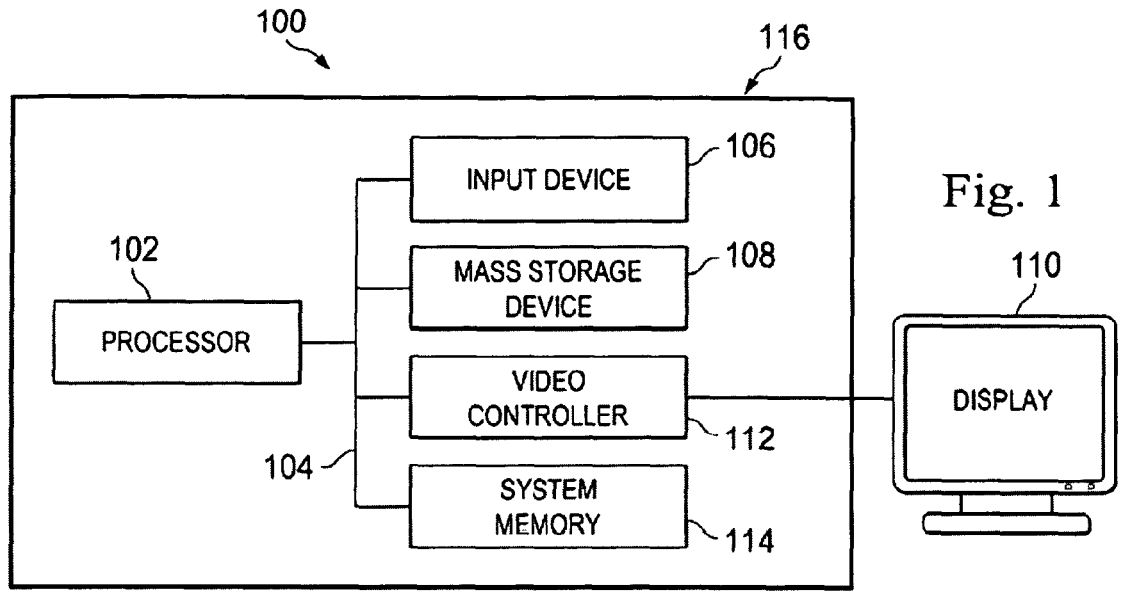
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
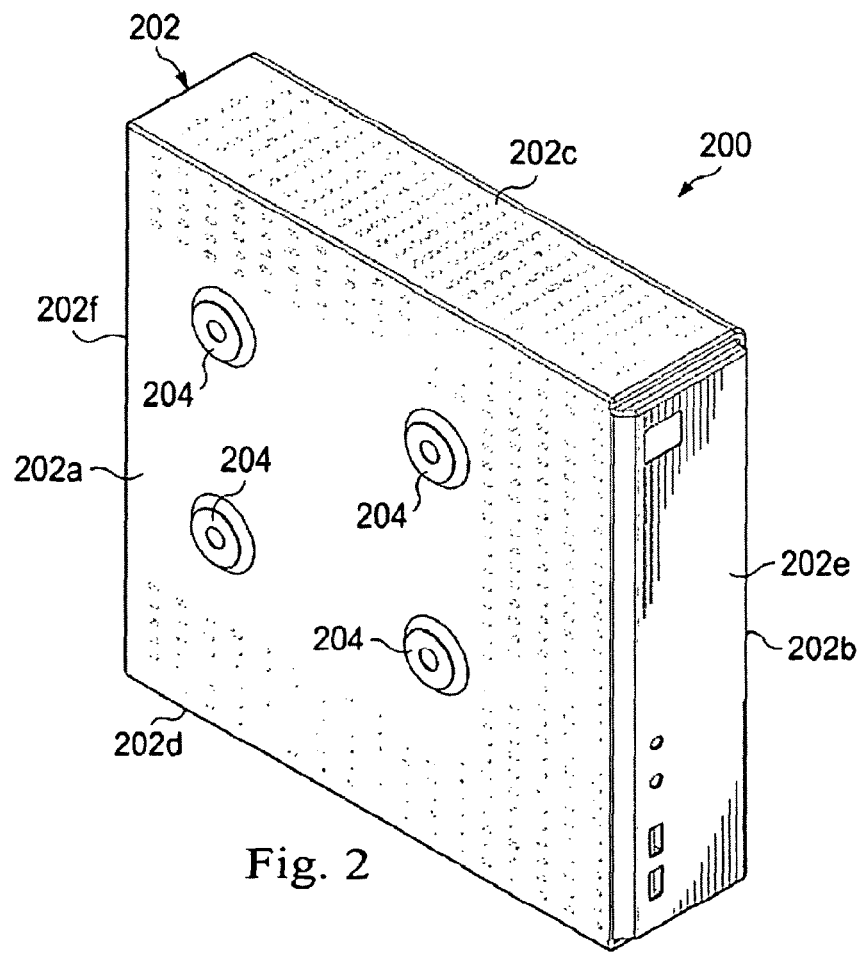
FIG. 2 is a perspective view illustrating an embodiment of an IHS chassis.

Referring now to FIG. 2, an IHS chassis 200 is illustrated. In an embodiment, the IHS chassis 200 may be, for example, the chassis 116 described above with reference to FIG. 1, and may house some or all of the components of the IHS 100. The IHS chassis 200 includes a base 202 having a front surface 202a, a rear surface 202b located opposite the front surface 202a, a top surface 202c extending between the front surface 202a and the rear surface 202b, a bottom surface 202d located opposite the top surface 202c and extending between the front surface 202a and the rear surface 202b, and a pair of opposing side surfaces 202e and 202f extending between the front surface 202a, the rear surface 202b, the top surface 202c, and the bottom surface 202d. A plurality of coupling apertures 204 are defined by the IHS chassis 200 and located in a spaced apart relationship from each other on the front surface 202a.

Figure 3:
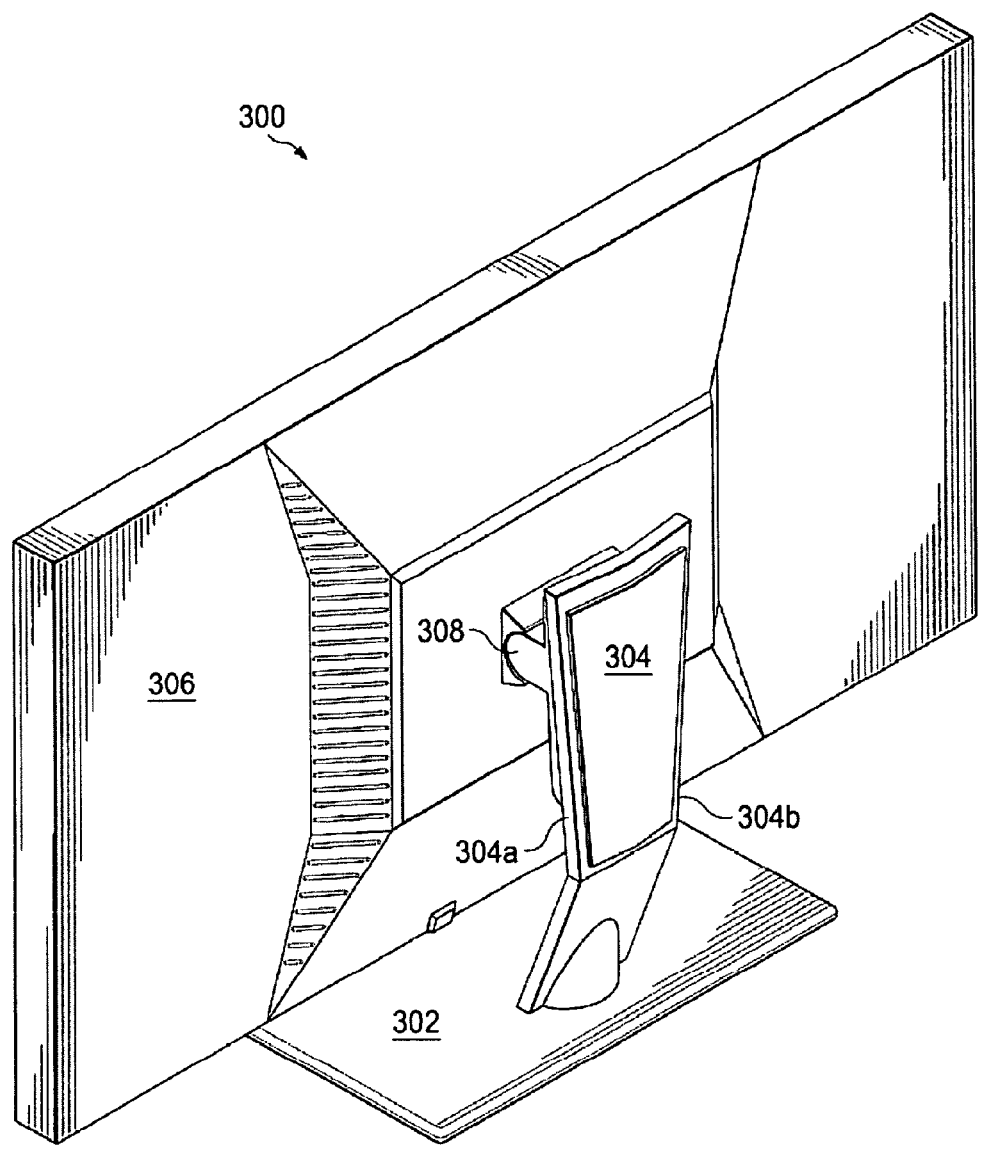
FIG. 3 is a perspective view illustrating an embodiment of display stand structure.

Referring now to FIG. 3, a display stand structure 300 is illustrated. The display stand structure 300 includes a base 302 having a vertical member 304 extending from the base 302. The vertical member 304 includes a pair of side surfaces 304a and 304b located on opposite sides of the vertical member 304. A display 306 is coupled to the vertical member 304 by a coupling 308. In an embodiment, the display 306 may be, for example, the display 110 described above with reference to FIG. 1, and the coupling 308 may allow the display 306 to be moved relative to the vertical member 304 using methods known in the art.

Figure 4A:
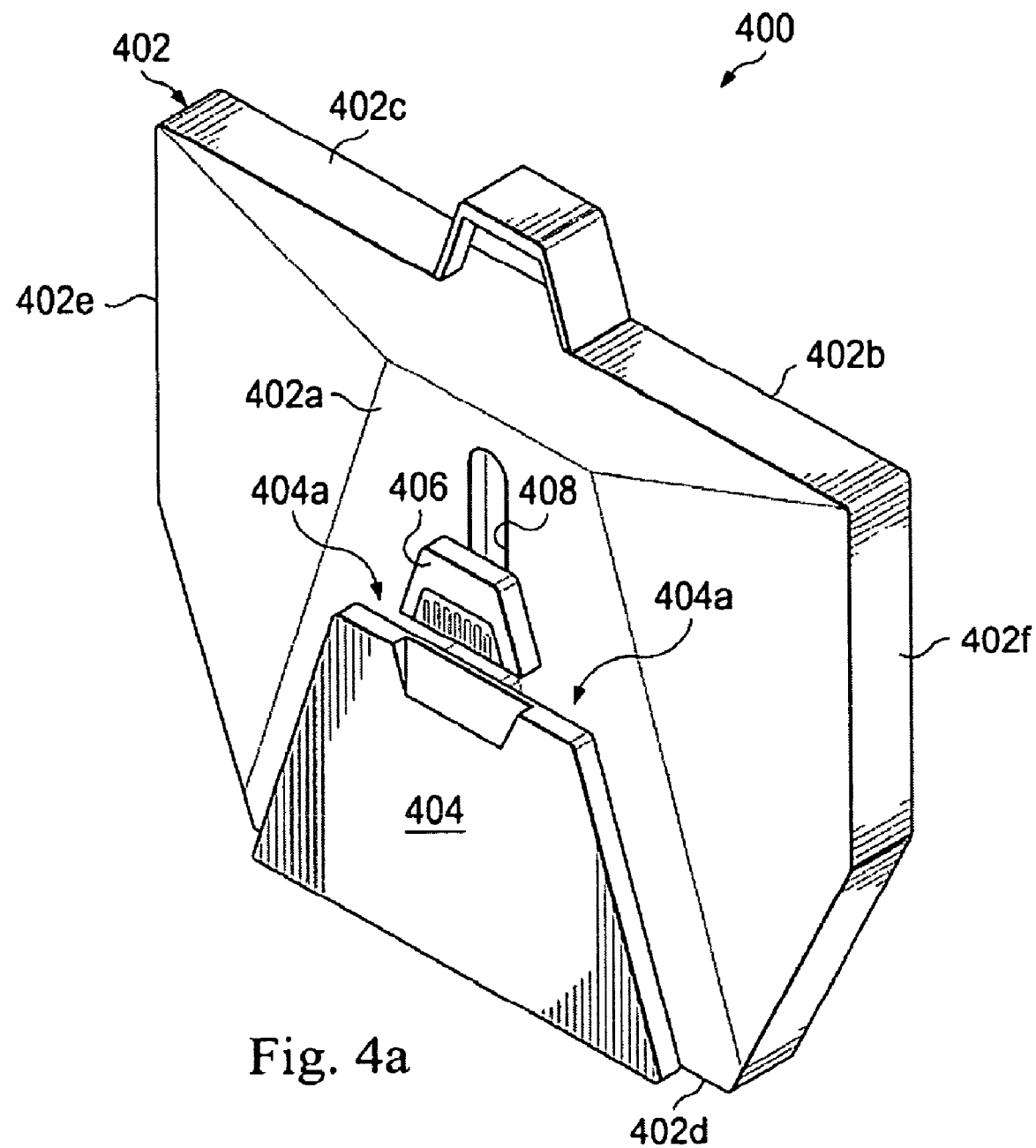
FIG. 4a is a front perspective view illustrating an embodiment of a display stand support section used with the display stand of FIG. 3.
Figure 4B:
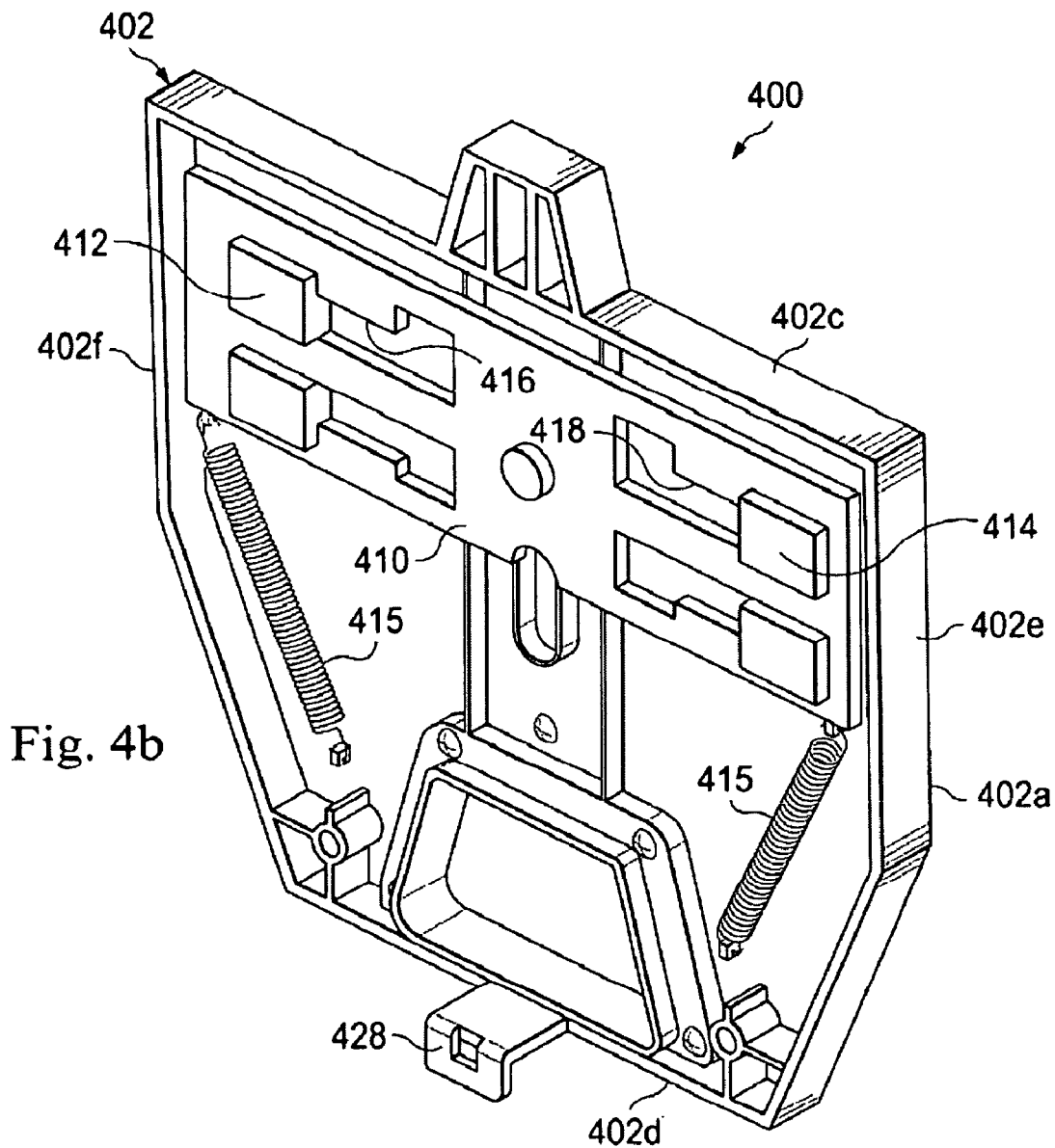

Referring now to FIGS. 4a, 4b and 4c, a display stand support section 400 of a chassis mounting system is illustrated. The display stand support section 400 includes a base 402 having a front surface 402a, a rear surface 402b located opposite the front surface 402a, a top edge 402c extending between the front surface 402a and the rear surface 402b, a bottom edge 402d located opposite the top edge 402c and extending between the front surface 402a and the rear surface 402b, and a pair of opposing side edges 402e and 402f extending between the front surface 402a, the rear surface 402b, the top edge 402c, and the bottom edge 402d. A coupling section support member 404 extends from the front surface 402a of the base 402 adjacent the bottom edge 402d and defines a plurality of slots 404a located between the coupling section support member 404 and the front surface 402a. A handle 406 extends through a channel 408 defined by the base 402 and out from the front surface 402a of the base 402. The handle 406 is coupled through the channel 408 to a bracket 410 that is housed in the base 402 of the support section 400 and that is moveably coupled to the base 402 such that the bracket 410 may move with the handle 406 along the length of the channel 408. A plurality of springs 415 are coupled to the bracket 410 and the base 402 in order to resiliently bias the bracket 410 towards the bottom edge 402d of the display stand support section 400. In an embodiment, the handle 406 and the bracket 410 include a locking device that is operable to restrict movement of the bracket 410 relative to the base 402. For example, the handle 406 may be a locking device actuator such as, for example, a thumbscrew, that may be actuated to engage the base 402 to prevent movement of the bracket 410 in the base 402. A plurality of arms 412 and 414 are coupled to the bracket 410 through a plurality of horizontal channels 416 and 418, respectively, that are defined by the bracket 410. The plurality of arms 412 and 414 extends from the bracket 410, through a plurality of diagonal channels 420 and 422 defined by the rear surface 402b of the base 402, and out from the rear surface 402b of the base 402. In an embodiment, each of the plurality of arms 412 and 414 may include a surface having a gripping member 424 that may include, for example, an elastomer material. In the illustrated embodiment, each of the gripping members 424 defines a gripping channel 426. A beam 428 extends from the rear surface 402b at a location that is immediately adjacent to and centrally oriented with respect to the bottom edge 402d of the base 402.

Figure 5A:
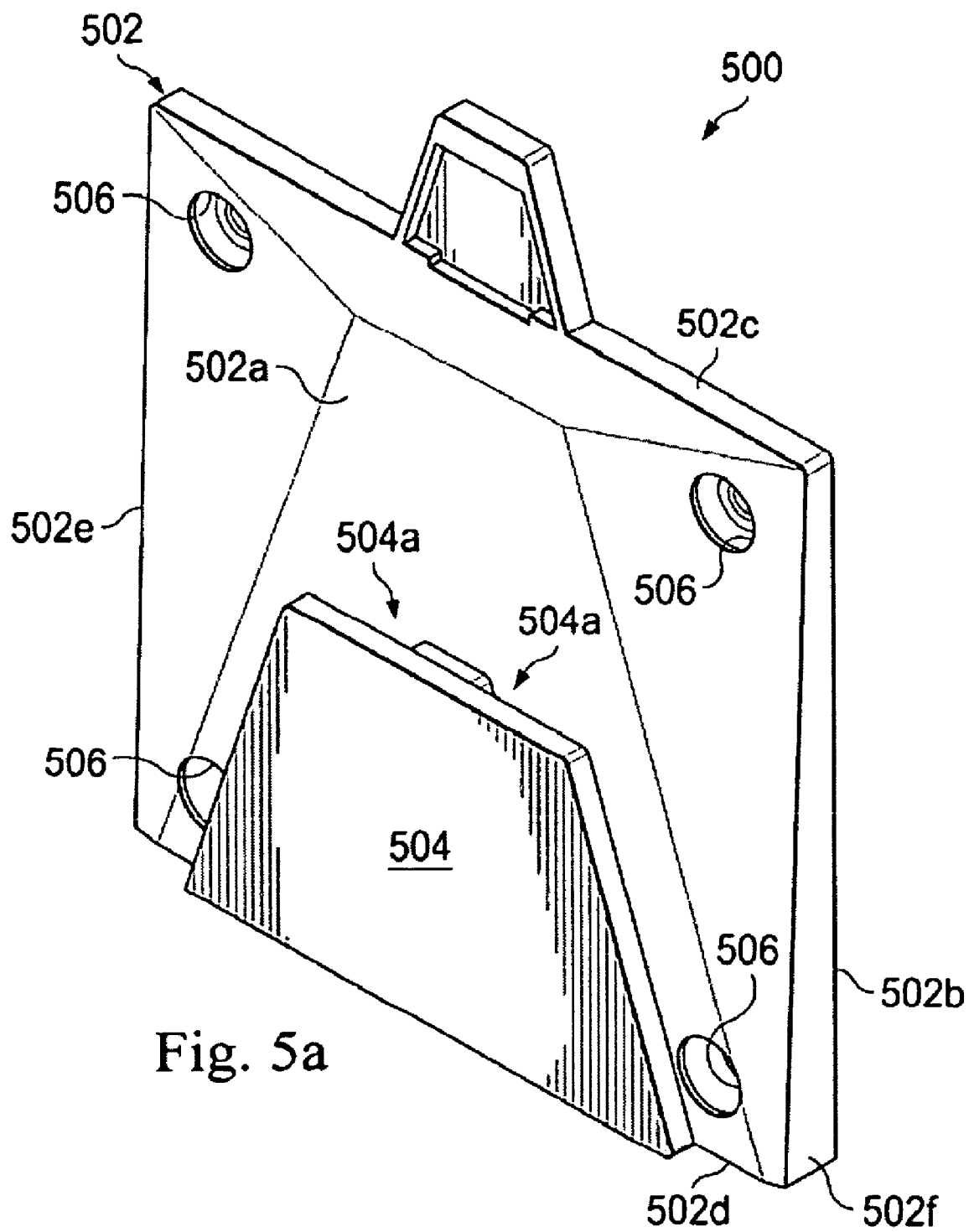
FIG. 5a is a front perspective view illustrating an embodiment of a wall support section.

Referring now to FIGS. 5a and 5b, a wall support section 500 of a chassis mounting system is illustrated. The wall support section 500 includes a base 502 having a front surface 502a, a rear surface 502b located opposite the front surface 502a, a top edge 502c extending between the front surface 502a and the rear surface 502b, a bottom edge 502d located opposite the top edge 502c and extending between the front surface 502a and the rear surface 502b, and a pair of opposing side edges 502e and 502f extending between the front surface 502a, the rear surface 502b, the top edge 502c, and the bottom edge 502d. A coupling section support member 504 extends from the front surface 502a of the base 502 adjacent the bottom edge 502d and defines a plurality of slots 504a located between the coupling section support member 504 and the front surface 502a. A plurality of structure securing apertures 506 are defined by the base 502, extend through the base 502 from the front surface 502a to the rear surface 502b, and are located in a spaced relationship from each other on the base 502.

Figure 6B:
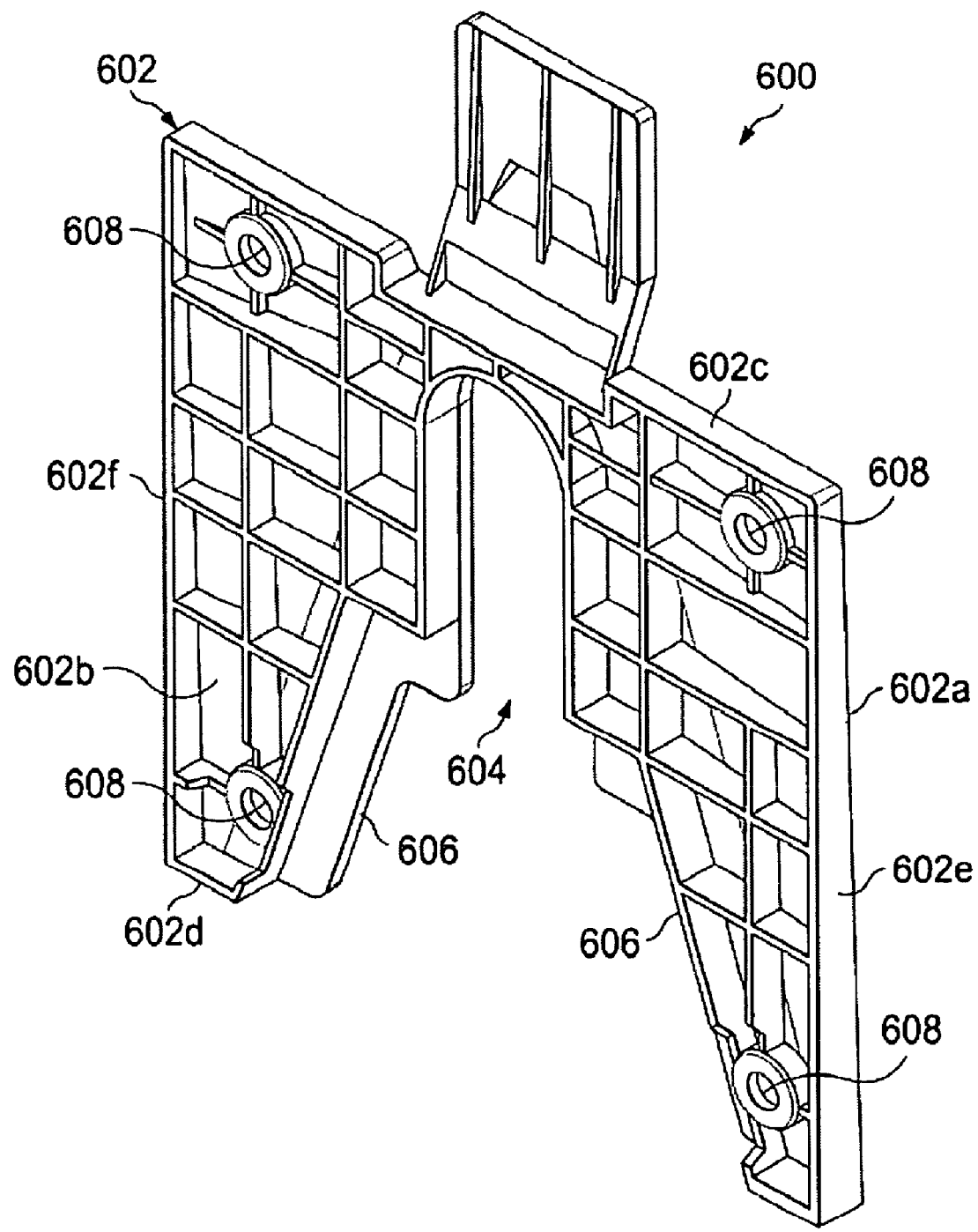

Referring now to FIGS. 6a and 6b, a coupling section 600 of a chassis mounting system is illustrated. The coupling section 600 includes a base 602 having a front surface 602a, a rear surface 602b located opposite the front surface 602a, a top edge 602c extending between the front surface 602a and the rear surface 602b, a bottom edge 602d located opposite the top edge 602c and extending between the front surface 602a and the rear surface 602b, and a pair of opposing side edges 602e and 602f extending between the front surface 602a, the rear surface 602b, the top edge 602c, and the bottom edge 602d. An channel 604 having a first section 604a and a second section 604b is defined by the base 602 and extends into the base 602 from the bottom edge 602d and through the base from the front surface 602a to the rear surface 602b. A plurality of coupling members 606 are located on opposite sides of the first section 604a of the channel 604. A plurality of chassis securing apertures 608 are defined by the base 602, extend through the base 602 from the front surface 602a to the rear surface 602b, and are located in a spaced relationship from each other.

Figure 7A:
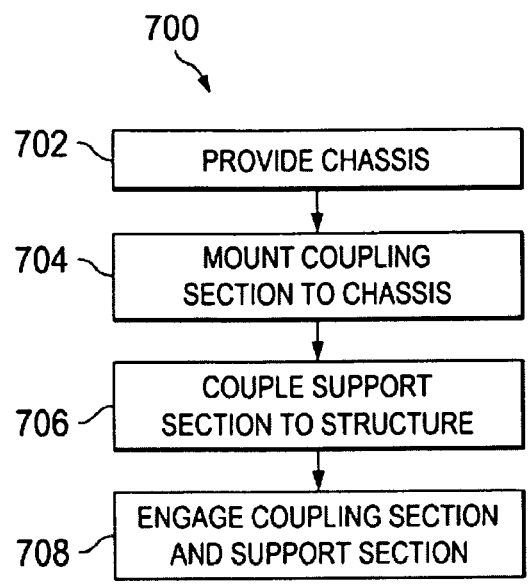
FIG. 7a is a flow chart illustrating an embodiment of a method for mounting a chassis.
Figure 7B:
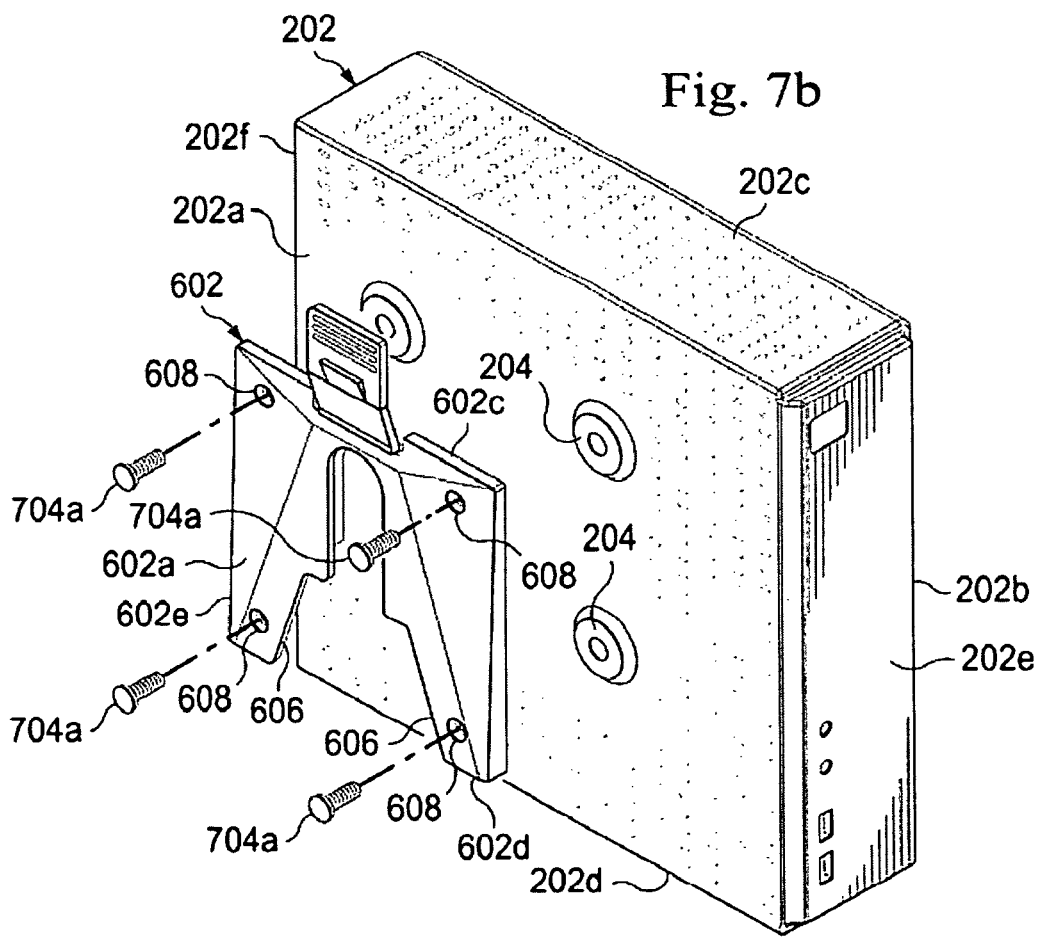
FIG. 7b is a perspective view illustrating an embodiment of the coupling section of FIGS. 6a and 6b being coupled to the IHS chassis of FIG. 2.
Figure 7C:
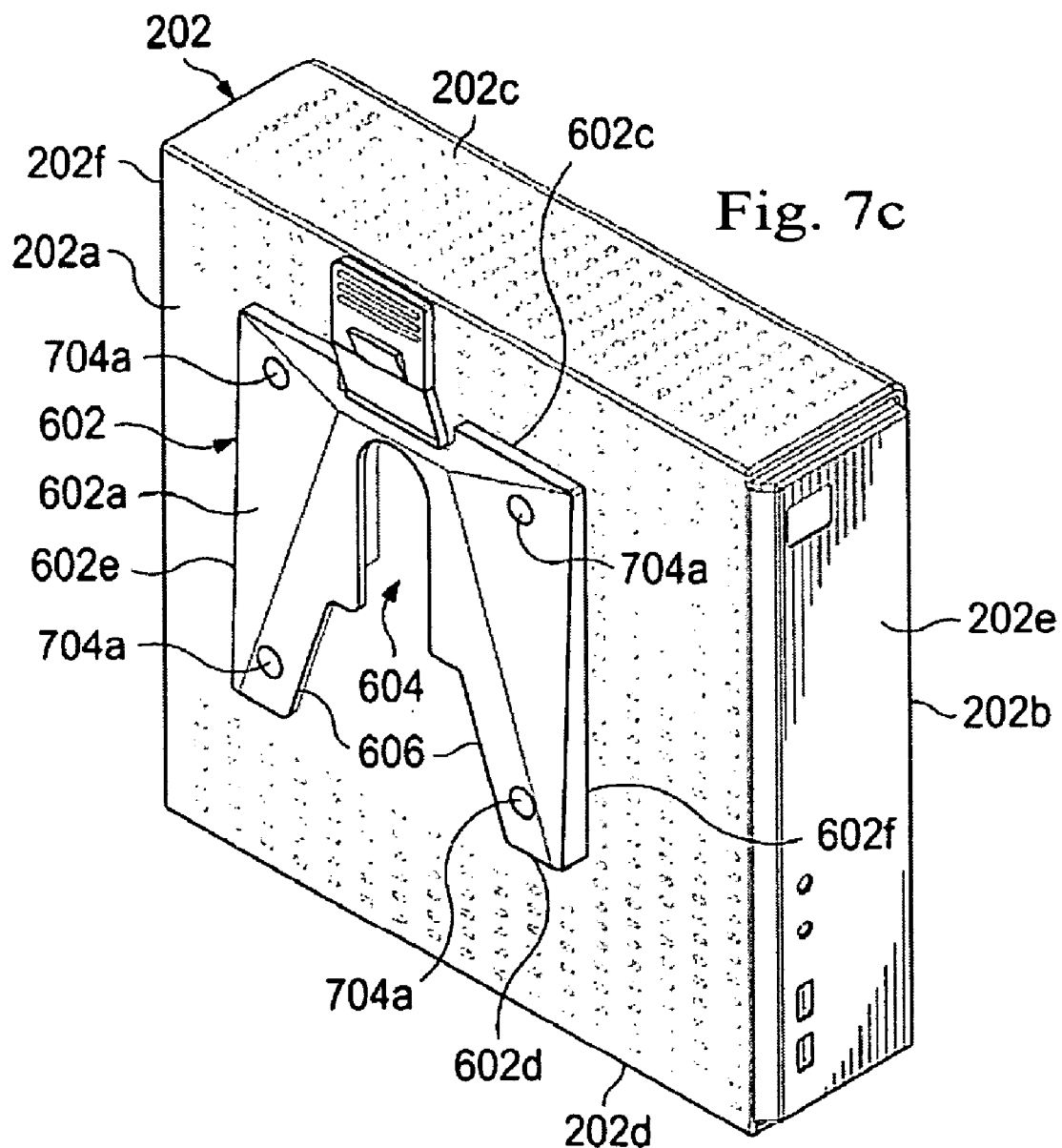
FIG. 7c is a perspective view illustrating an embodiment of the coupling section of FIGS. 6a and 6b coupled to the IHS chassis of FIG. 2.

Referring now to FIGS. 2, 6a, 6b, 7a, 7b and 7c, a method 700 for mounting an IHS chassis is illustrated. The method 700 begins at block 702 where a chassis is provided. In an embodiment, the IHS chassis 200 is provided. The method 700 then proceeds to block 704 where a coupling section is mounted to the chassis. In an embodiment, the coupling section 600 is positioned adjacent the IHS chassis 200 such that the rear surface 602b of the coupling section is immediately adjacent the front surface 202a of the IHS chassis 200 with the chassis securing apertures 608 on the coupling section 600 aligned with the coupling apertures 204 on the IHS chassis 200, as illustrated in FIG. 7b. A plurality of fasteners 704a may then be positioned in the chassis securing apertures 608 and the coupling apertures 204 in order to secure the coupling section 600 to the IHS chassis 200, as illustrated in FIG. 7c.

Figure 7E:
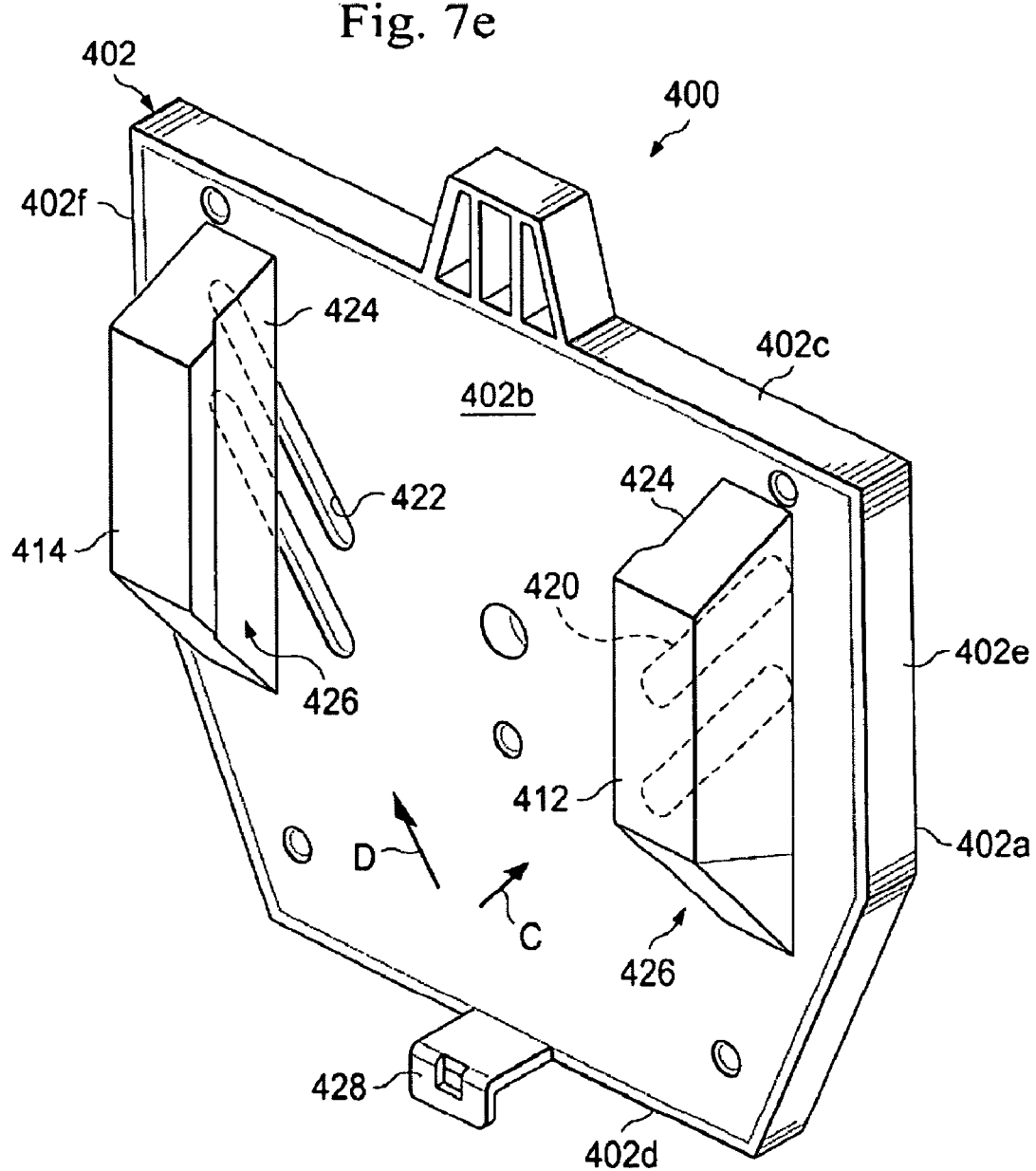
FIG. 7e is a rear view illustrating an embodiment of the display stand support section of FIGS. 4a, 4b and 4c during coupling.
Figure 7F:
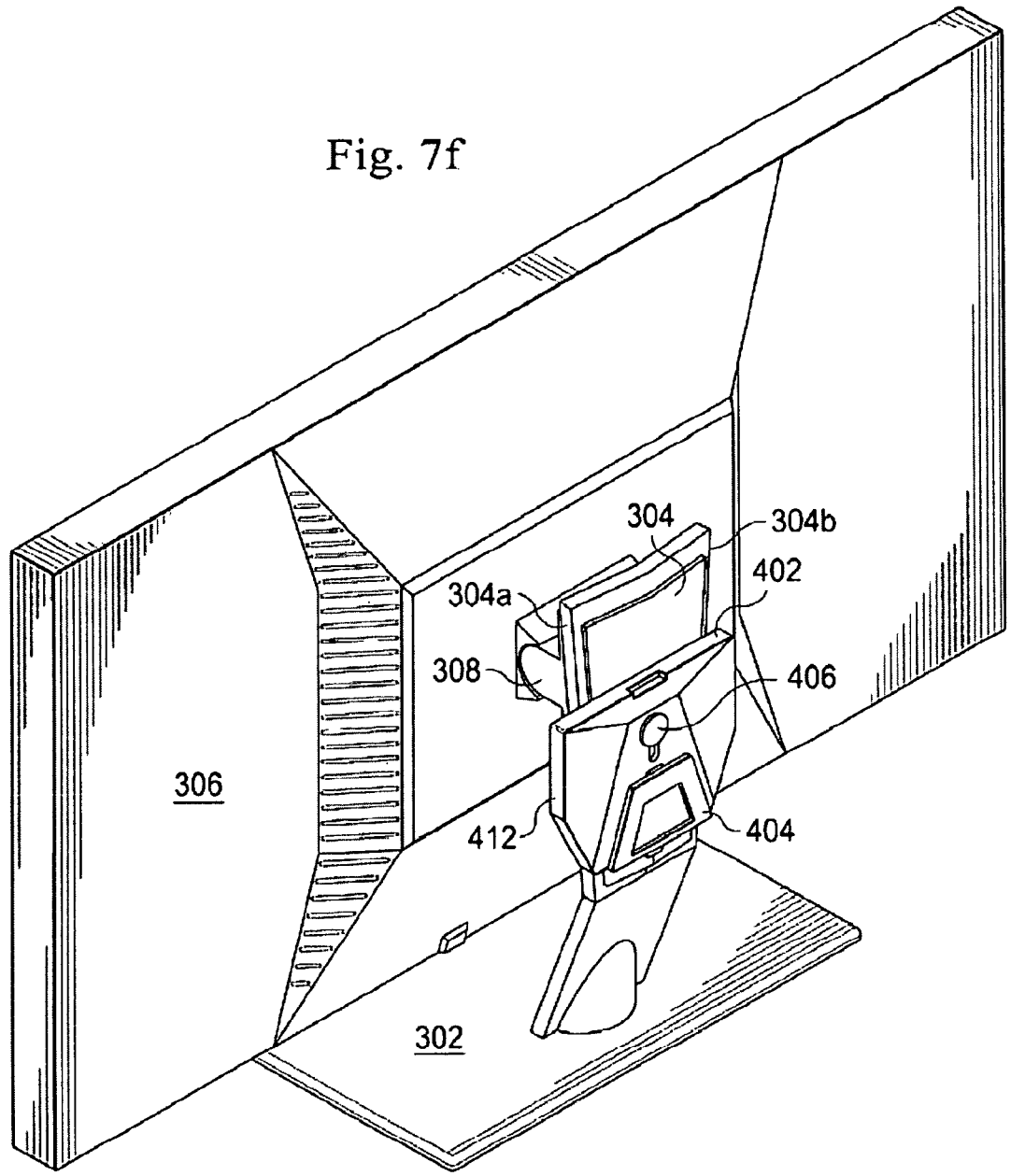
FIG. 7f is a perspective view illustrating an embodiment of the display stand support section of FIGS. 4a, 4b and 4c coupled to the display stand structure of FIG. 3.

Referring now to FIGS. 3, 4a, 4b, 4c, 7a, 7d, 7e and 7f, the method 700 proceeds to block 706 where a support section is coupled to a structure. In an embodiment, the display stand support section 400 is coupled to the display stand structure 300. FIGS. 4a and 4c illustrate that the handle 406 and the arms 412 and 414 on the display stand support section 400 are resiliently biased into a gripping orientation A due to the coupling of the springs 415 and bracket 410 that resiliently biases the bracket 410 towards the bottom edge 402d of the display stand support section 400. In order to couple the display stand support section 400 to the display stand structure 300, the display stand support section 400 is positioned adjacent the display stand structure 300 such that the rear surface 402b of the display stand support section 400 is located adjacent the vertical member 304 on the display stand structure 400 with the arm 412 located adjacent the side surface 304a and the arm 414 located adjacent the side surface 304b. The handle 406 on the display stand support section 400 is then moved in a direction B, illustrated in FIG. 7d. Movement of the handle 406 in the direction B causes the bracket 410 to move in the direction B (away from the bottom edge 402d and against the biasing force of the springs 415, as illustrated in FIG. 4b) and results in the arms 412 and 414 traveling through the diagonal channels 420 and 422, respectively, such that the arm 412 moves in a direction C and the arm 414 moves in a direction D in order to vary the distance between the arms 412 and 414, as illustrated in FIG. 7e. The display stand structure 400 is then moved between the arms 412 and 414 and the handle 406 is released, allowing the springs 415 to bias the bracket 410 back towards the bottom edge 402d such that the arms 412 and 414 move towards each other and back into the gripping orientation A in order to provide a gripping force on the vertical member 304, as illustrated in FIG. 7f. In an embodiment, the sides surfaces 304a and 304b of the vertical member 304 are located in the gripping channels 426 such that the gripping members 424 'wrap around' the vertical member 304 to secure the display stand support section 400 to the vertical member 304. In an embodiment, the handle 406 may be a locking device actuator and may be actuated in order to prevent movement of the bracket 410 and restrict the movement of the arm 412 relative to the arm 414 in order to secure the display stand support section 400 to the vertical member 304 once the gripping force has been applied. In an embodiment, the beam 428 on the display stand support section 400 engages the vertical member 304 to restrict movement of the display stand support section 400 along the length of the vertical member 304.

Figure 7G:
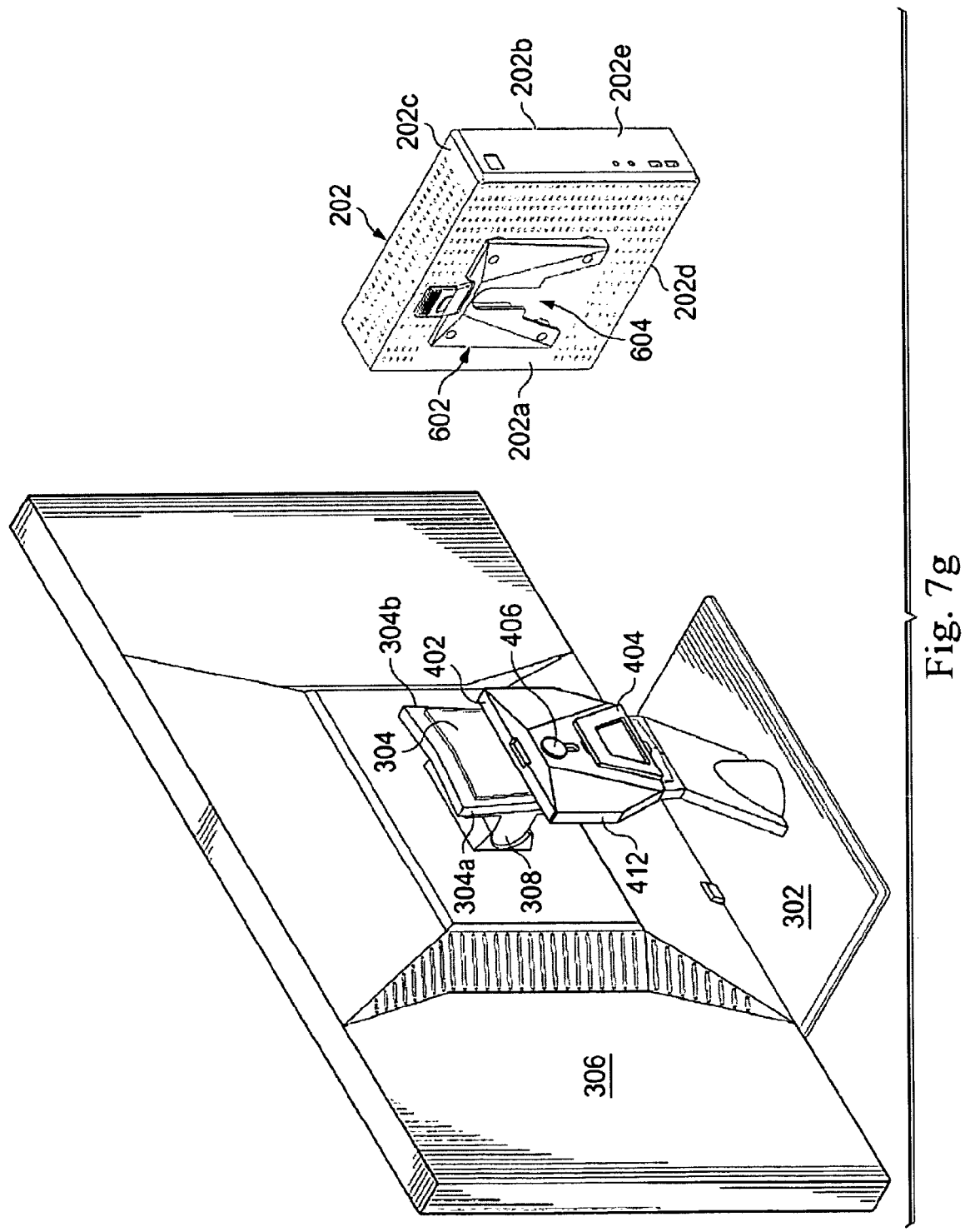
FIG. 7g is a perspective view illustrating an embodiment of the IHS chassis and coupling member of FIG. 7c being coupled to the display stand support section and display stand structure of FIG. 7f.
Figure 7H:
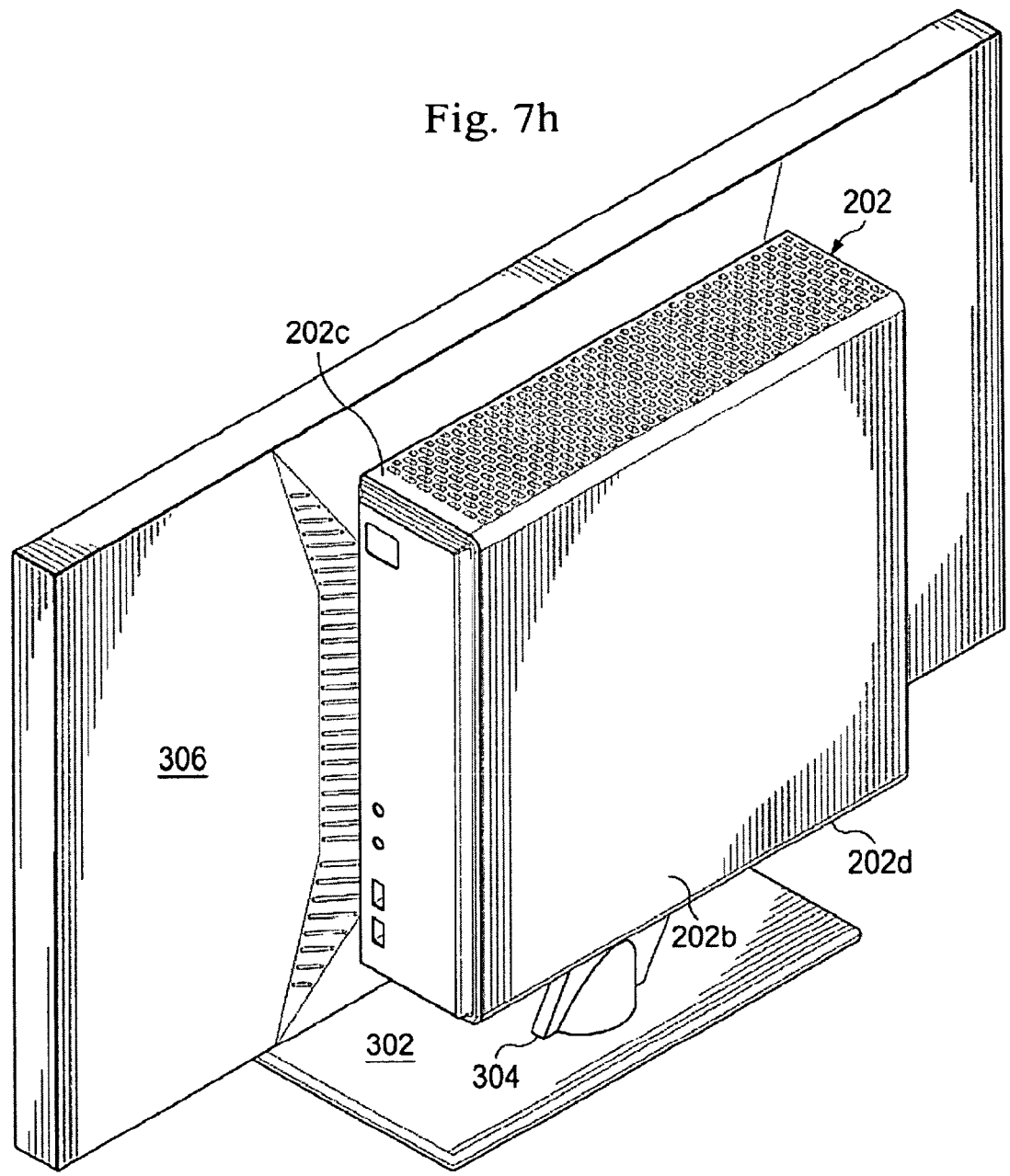
FIG. 7h is a perspective view illustrating an embodiment of the IHS chassis and coupling member of FIG. 7c coupled to the display stand support section and display stand structure of FIG. 7f.

Referring now to FIGS. 4a, 6a, 7a, 7g and 7h, the method 700 then proceeds to block 708 where the coupling section is engaged with the support section. The IHS chassis 200 with the coupling section 600 is positioned adjacent the display stand support section 400 on the display stand structure 300 such that the initial section 604a of the channel 604 is located adjacent to and slightly above the coupling section support member 404, as illustrated in FIG. 7g. The IHS chassis 200 and coupling section 600 are moved towards the display stand support section 400 such that the coupling members 606 on the coupling section 600 are located adjacent the slots 404a defined by the display stand support section 400. The IHS chassis 200 is then moved such that the coupling section support member 404 moves into the initial section 604a of the channel 604 and the coupling members 606 on the coupling section 600 engage the coupling section support member 404 by entering the slots 404a in order to couple the coupling section 600 to the display stand support section 400 such that the display stand support section 400 supports the coupling section 600 and the attached IHS chassis 200, as illustrated in FIG. 7h.

Figure 8A:
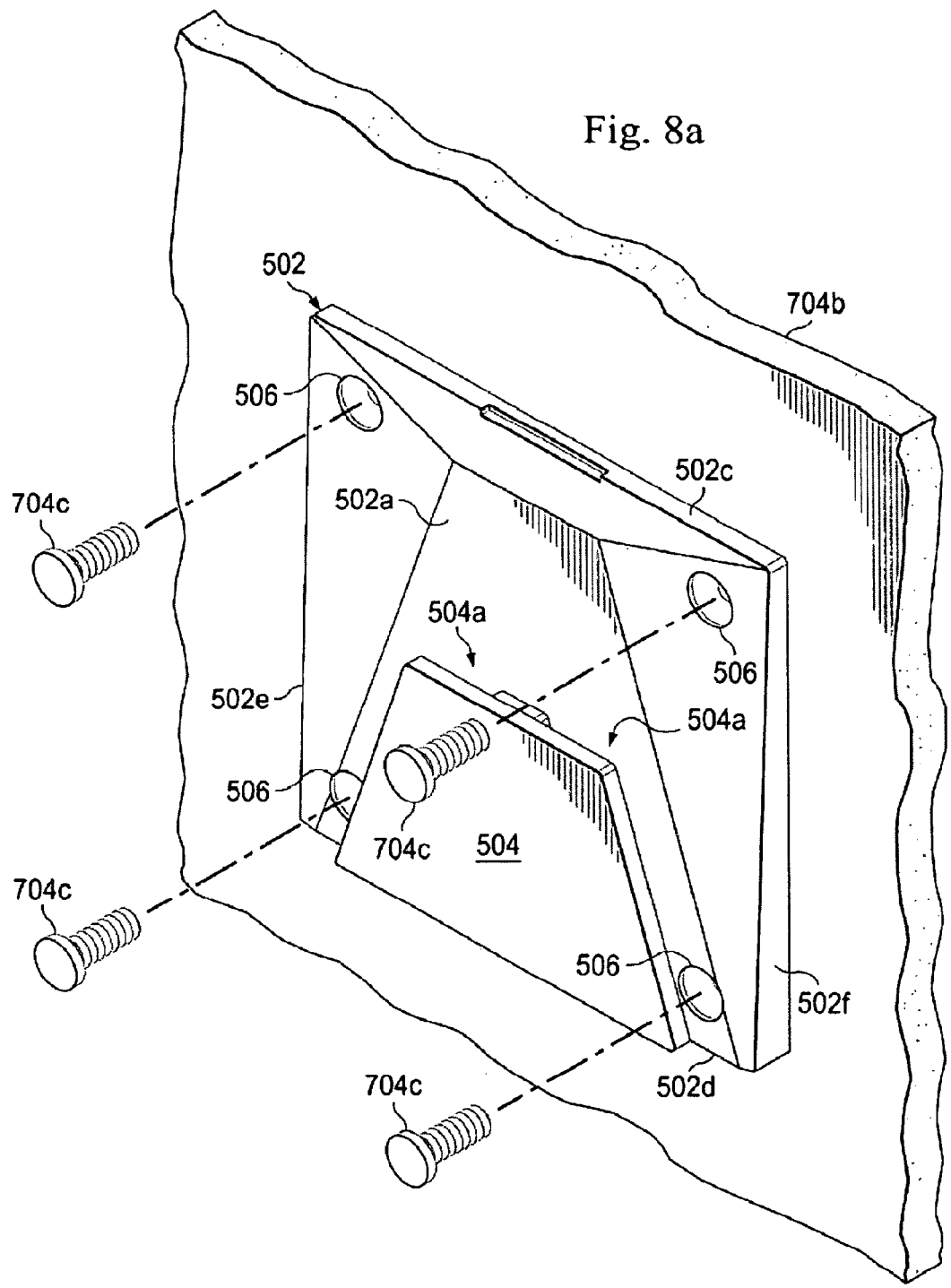
FIG. 8a is a perspective view illustrating an embodiment of the wall support section of FIGS. 5a and 5b being coupled to a wall structure.

Referring now to FIGS. 5a, 5b, 7a and 8a, in an alternative embodiment, the method 700 may be performed using the wall support section 500 in place of the display stand support section 400. In such an embodiment, blocks 702 and 704 of the method 700 remain the same and are performed substantially as described above. After block 704, the method 700 proceeds to block 706 where a support section is coupled to a structure. In an embodiment, the wall support section 500 is coupled to a wall structure 704b by positioning the rear surface 502b of the wall support section 500 immediately adjacent the wall structure 704b and securing a plurality of fasteners 704c to the wall structure 704b through the structure securing apertures 506, as illustrated in FIG. 8a.

Figure 8B:
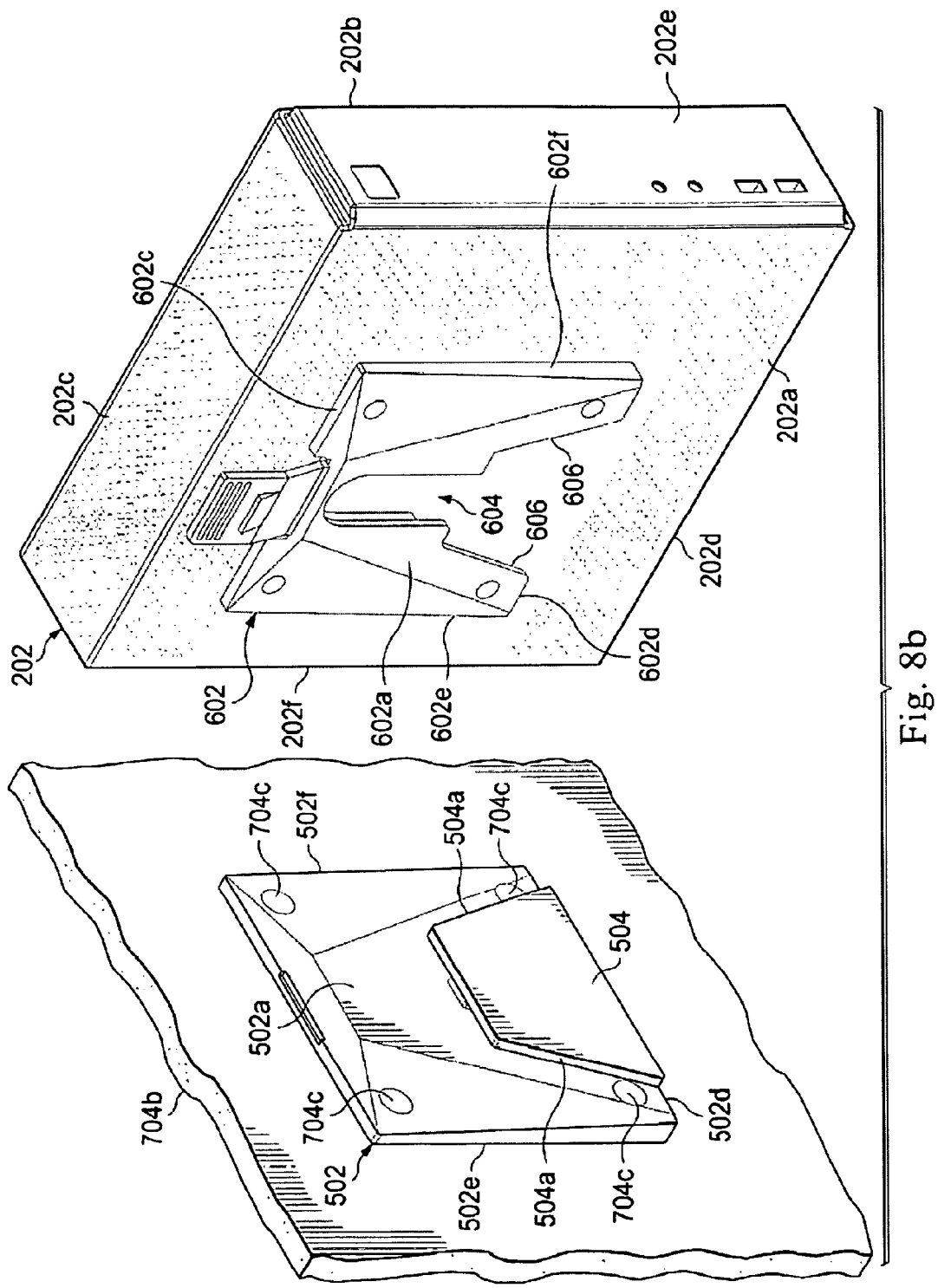
Figure 8C:
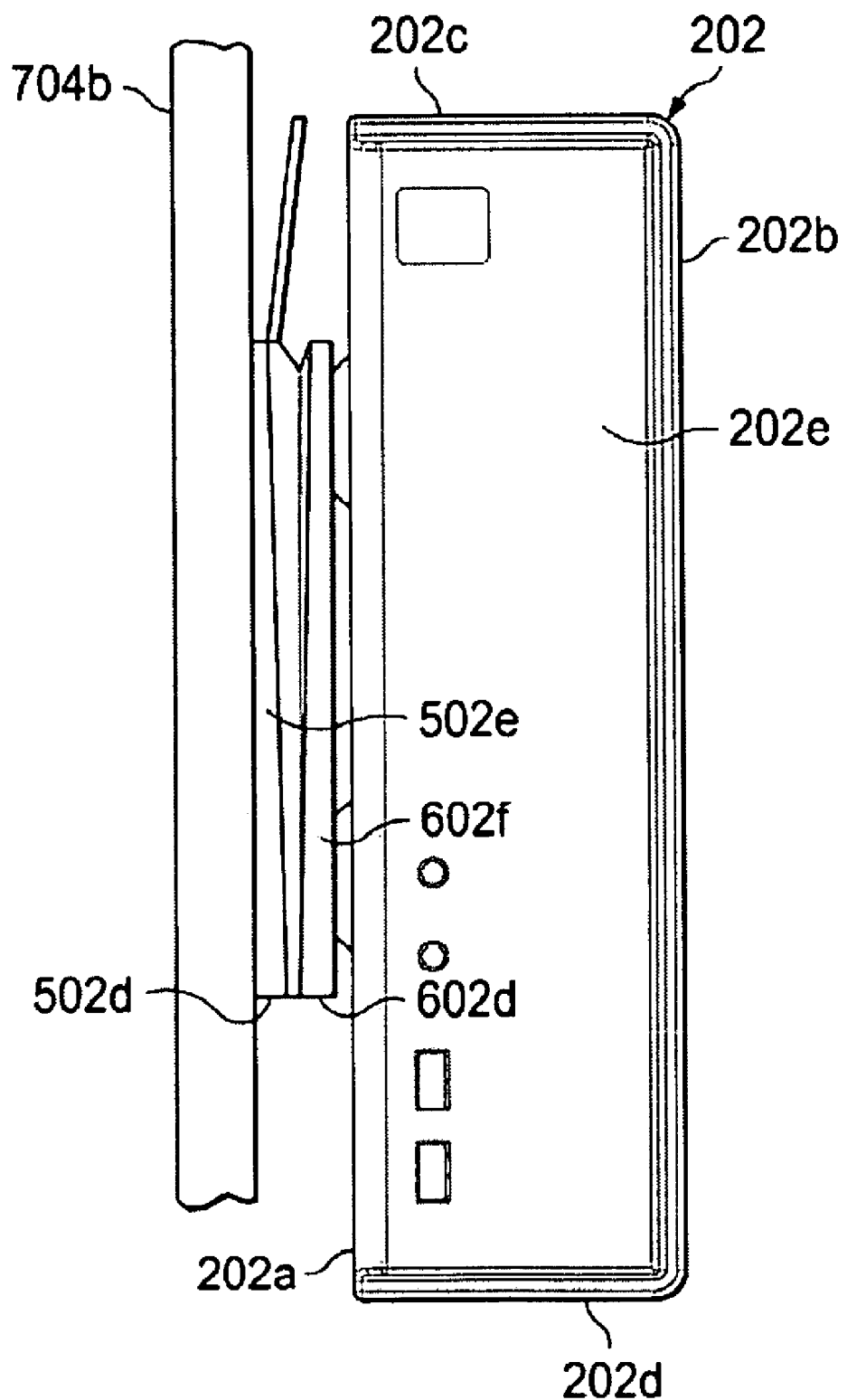

Referring now to FIGS. 5a, 6a, 7a, 8b and 8c, the method 700 then proceeds to block 708 where the coupling section is engaged with the support section. The IHS chassis 200 with the coupling section 500 is positioned adjacent the wall support section 500 on the wall structure 704b such that the initial section 604a of the channel 604 is located adjacent to and slightly above the coupling section support member 504, as illustrated in FIG. 8b. The IHS chassis 200 and coupling section 600 are moved towards the wall support section 500 such that the coupling members 606 on the coupling section 600 are located adjacent the slots 504a defined by the wall support section 500. The IHS chassis 200 is then moved such that the coupling section support member 504 moves into the initial section 604a of the channel 604 and the coupling members 606 engage the coupling section support member 504 by entering the slots 504a in order to couple the coupling section 600 to the wall support section 500 such that the wall support section 500 supports the coupling section 600 and the attached IHS chassis 200, as illustrated in FIG. 8c. Thus, a system and method are provided that allow a chassis to be mounted to a structure and includes an adjustable support section that allows the mounting position to be altered depending on different structure dimensions and desired mounting locations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A chassis mounting system, comprising:
a support section that is operable to be coupled to a structure, wherein the support section comprises:
   a first arm extending from the support section;
   a second arm extending from the support section, wherein the second arm is moveable relative to and towards the first arm such that the distance between the first arm and the second arm may be reduced in order to apply a gripping force by each of the first arm and the second arm towards the structure when the structure is located between the first arm and the second arm;
   a locking device that is operable to restrict the movement of the second arm relative to the first arm in order to secure the support section to the structure when the gripping force has been applied; and
   a coupling section support member; and
a coupling section that is operable to be mounted to a chassis, wherein the coupling section comprises a coupling member that is operable to engage the coupling section support member in order to couple the coupling section to the support section such that the support section supports the coupling section.

2. The system of claim 1, wherein each of the first arm and the second arm comprise a gripping member.

3. The system of claim 1, further comprising:
a handle extending from the support structure and operable to move the second arm relative to the first arm.

4. The system of claim 3, wherein the handle comprises a locking device actuator.

5. The system of claim 1, wherein the coupling section support member comprises at least one slot defined by the support section, and wherein the coupling member is operable to be positioned in the at least one slot in order to couple the coupling section to the support section such that the support section supports the coupling section.

6. The system of claim 1, wherein the first arm and the second arm are resiliently biased into a gripping orientation.

7. The system of claim 1, wherein the structure comprises a display stand.

8. The system of claim 1, wherein the chassis comprises an information handling system chassis.

9. An information handling system (IHS), comprising:
an IHS chassis;
a processor located in the IHS chassis;
a coupling section that is mounted to the IHS chassis, wherein the coupling section comprises at least one coupling member;
a display stand; and
a support section coupled to the display stand, the support section comprising:
   a first arm extending from the support section;
   a second arm extending from the support section, wherein the display stand is positioned between the first arm and the second arm and the second arm has been moved relative to and towards the first arm in order to apply a gripping force by each of the first arm and the second arm towards the display stand;
   a locking device restricting the movement of the second arm relative to the first arm in order to secure the support section to the display stand with the gripping force applied; and
   a coupling section support member;
wherein the at least one coupling member on the coupling section engages the coupling section support member in order to couple the coupling section to the support section such that the support section supports the coupling section and the IHS chassis.

10. The IHS of claim 9, wherein each of the first arm and the second arm comprise a gripping member.

11. The IHS of claim 9, further comprising:
a handle extending from the support structure and operable to move the second arm relative to the first arm.

12. The IHS of claim 9, wherein the first arm and the second arm are resiliently biased into a gripping orientation.

13. The IHS of claim 9, wherein the structure comprises a display stand and at least a portion of the display stand is located between the first arm and the second arm.

14. The IHS of claim 9, wherein the structure comprises a surface, and the support section is mounted to the surface with at least one fastener.

15. A method for mounting an information handling system (IHS) chassis, comprising:
providing a IHS chassis;
mounting a coupling section to the IHS chassis;
coupling a support section to a structure, wherein the support section comprises a first arm and a second arm each extending from the support section in a spaced apart orientation, wherein the second arm is moved relative to and towards the first arm such that the distance between the first arm and the second arm is reduced in order to apply a gripping force by each of the first arm and the second arm towards the structure when the structure is located between the first arm and the second arm in order to couple the support section to the structure; and
engaging the coupling section with the support section in order to couple the coupling section to the support section such that the support section supports the coupling section and the IHS chassis.

16. The method of claim 15, further comprising:
restricting the movement of the second arm relative to the first arm using a locking device in order to secure the support section to the structure once the gripping force has been applied.

17. The method of claim 15, wherein the structure comprises a display stand.

18. The method of claim 15, further comprising:
resiliently biasing the first arm and the second arm into a gripping orientation.

* * * * *